United States Patent [19]

Long

[11] 3,842,232
[45] Oct. 15, 1974

[54] OVEN TEMPERATURE LIMITER
[75] Inventor: George B. Long, Dayton, Ohio
[73] Assignee: General Motors Corporation, Detroit, Mich.
[22] Filed: Sept. 28, 1973
[21] Appl. No.: 401,589

[52] U.S. Cl............................... 219/513, 337/322
[51] Int. Cl. ............................................. H05b 1/02
[58] Field of Search.................... 337/320, 321, 322; 219/513

[56] References Cited
UNITED STATES PATENTS
2,224,552  12/1940  Sickinger ......................... 219/513 X
2,816,998  12/1957  Fry et al. ......................... 219/513 X FOREIGN PATENTS OR APPLICATIONS
572,831  6/1924  France ............................... 337/322

Primary Examiner—J. D. Miller
Assistant Examiner—Fred E. Bell
Attorney, Agent, or Firm—K. H. MacLean, Jr.

[57] ABSTRACT

An oven temperature control particularly adapted for use with self-cleaning ovens including a control position allowing the oven heating elements to warm the oven to a high temperature for eliminating spilled foot material from oven walls. The temperature control includes a Bourdon tube with an arcuate shape when at room temperature and pressure. The Bourdon tube has a sealed interior which is filled with a thermally expansive material to cause straightening of the tube with increasing oven temperatures. A pair of contacts operated by the Bourdon tube are connected in a fused circuit to energize the heating elements. The contacts are closed only by movement of the Bourdon tube into a fully curved position caused only by leakage of the thermally expansive material from the interior of the Bourdon tube. The closing of the contact pair applies an excessive current to the fuse, which opens it, thus terminating energization of the oven heating elements to resultantly prevent the oven temperature from exceeding a safe level.

2 Claims, 2 Drawing Figures

PATENTED OCT 15 1974   3,842,232

3,842,232

OVEN TEMPERATURE LIMITER

This invention relates to oven temperature controls and particularly to an oven control for a self-cleaning type oven to prevent the oven temperatures from exceeding a maximum level whenever there is leakage of thermally expansive material from a sealed Bourdon tube element.

Oven temperature controls commonly utilize movable sensor elements with sealed interiors filled with thermally expansive material. The expansive material is pressurized by increasing oven temperatures. Self-cleaning ovens include a control position which energizes the Bake and Broil heating elements to produce high temperatures within the oven to cause spilled food on the oven walls to be burned away, thus cleaning the oven. The present invention includes means to deenergize the oven heating elements whenever leakage of the thermally expansive material from the Bourdon type elements renders it inoperative to control oven temperatures. When inoperative, the Bourdon sensor may permit oven temperatures to exceed a predetermined design level.

The present oven control has a curved Bourdon type element which contains a sealed quantity of thermally expansive material which responds to changes in oven temperature through a connected capillary tube and a thermal bulb located in the oven. Movement of the curved portion of the Bourdon tube in response to changes in oven temperature controls the energization of the oven heating elements to produce predetermined temperatures corresponding to settings of the oven control. The present invention includes a pair of normally open contacts operated by the Bourdon tube which close only when the Bourdon tube assumes a fully curved position corresponding to an empty element. For calibration, position of the Bourdon tube corresponds to the position assumed at a predetermined low temperature and pressure which is substantially below room temperature and pressure. Thus, for all practical purposes, the Bourdon element closes the contact pair only when the thermally responsive material leaks from the Bourdon tube or capillary.

A fuse placed in the heating element circuit controls energization of the heating elements. One terminal of the contact pair is connected to the fuse and the other terminal is connected to another leg of the electrical source to produce a short-circuit through the contact pair and the fuse when the contacts are closed. The resultant opening of the fuse deenergizes the oven heating elements and prevents further energization thereof.

Therefore, an object of the present invention is to provide an oven temperature controller of simple construction utilizing a pair of contacts which are closed only when the fluid in a Bourdon type element is discharged.

A further object of the present invention is to provide an oven temperature controller of the Bourdon tube type and switch means operated by the sensor element which are closed only when the thermally expansive material in the Bourdon element has leaked therefrom to deenergize the oven heating elements.

A still further object of the present invention is to provide an oven temperature controller of the Bourdon tube type utilizing a temperature sensor element with thermally expansive material sealed therein and including a contact pair closed only by movement of the sensor element to a fully relaxed position assumed when the thermally expansive material has leaked from the Bourdon element.

Further objects and advantages of the present invention will be more readily apparent from the following description, reference being had to the drawings in which a preferred embodiment is illustrated.

IN THE DRAWINGS

Figure 1:
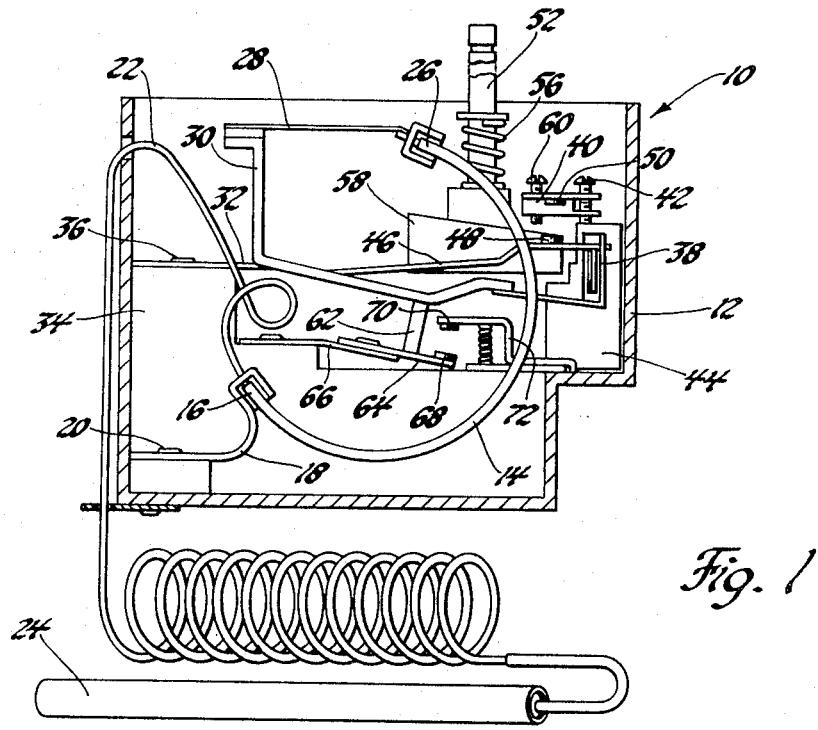
FIG. 1 is a sectioned view of an oven temperature control asssembly.

In FIG. 1 of the drawings, an oven temperature control assembly 10 is illustrated. Assembly 10 includes a housing 12 which encloses a curved or arcuate shaped Bourdon tube member 14 having a fixed end 16 mounted to housing 12 by a bracket 18. Bracket 18 itself is connected to housing 12 by a rivet connector 20. The Bourdon tube sensor 14 is a flattened hollow member which normally assumes the curved position shown in FIG. 1 at room temperatures and pressures. The hollow interior of the Bourdon tube 14 contains a quantity of thermally expansive material, such as helium gas. The sensor interior is connected by a capillary tube 22 to a temperature bulb 24 located within the interior of the oven to directly sense oven temperatures. The bulb 24, capillary tube 22 and Bourdon tube 14 are all interconnected and filled with the thermally expansive helium gas. When the expansive material in bulb 24 is exposed to increasing oven temperatures, it pressurizes the interior of the Bourdon tube 14. This pressurization causes the free end 26 of the tube 14 to move to the right in FIG. 1 and the tube to straighten. Conversely, when bulb 24 is exposed to decreasing oven temperatures, the interior of tube 14 is depressurized and the free end 26 moves toward the left and the tube 14 assumes a more curved position.

The free end 26 of tube 14 is connected by a resilient metal strip 28 to an arm 30. The arm 30 is attached by a flexible metal hinge 32 to a portion 34 of housing 12 by a rivet 36. The arm 30 is permitted to pivot by movement of hinge 32 in response to the movement of the free end 26. This causes an extended portion 38 of the arm 30 to move in a generally vertical direction with respect to a contact support 40. The contact support 40 is operably connected by an adjusting screw 42 to a portion 44 of housing 12.

The end portion 38 engages an extended arm portion 46 of hinge 32. Arm 46 supports a contact 48 which is adapted to electrically engage another contact 50 upon the support 40. Contacts 48 and 50 form a contact pair which are electrically connected in the oven heating element circuit to be discussed later in connection with FIG. 2. When bulb 24 is exposed to increasing refrigerant temperatures beyond a preselected set temperature, resultant pressurization of tube 14 straightens it and causes end 26 to move to the right in FIG. 1 and pivot arm 30 by means of strip 28. This moves the contact 48 downward away from contact 50, thus temporarily deenergizing the heating circuit. When the temperature in the oven decreases below the preselected set temperature, resultant depressurization of tube 14 permits it to return to a more curved position and causes end 26 to move to the left and pivot arm 30 clockwise. This causes contact 48 to move upward into engagement with contact 50 and again energize the oven heating element.

The aforesaid preselected set temperature is manually set by rotating an oven temperature selector shaft 52 which extends from housing 12. The shaft 52 extends through a coil spring 56 to an oven temperature cam 58. Cam 58, when rotated, engages the bottom end of a bake adjustment screw 60 to move the contact support 40 in a vertical direction in FIG. 1. This places the contact 50 at variable distances from contact 48 for a range of desired oven temperatures.

The subject oven temperature controller 10 is readily adapted for use in self-cleaning type ovens in which a mode selection of the selector shaft 52 is added for heating the oven to a high temperature of about 900° F. to cause food spilled or splashed on the walls of the oven to be burned away and thus the oven cleaned. The oven temperature control having a temperature responsive sensor containing thermally expansive material is desirable for controlling oven temperatures in ovens of this type. The subject invention provides means responsive to the relaxed position of a gas-filled Bourdon tube to prevent oven temperatures from exceeding about 1100° F. This high temperature would be encountered only when the thermally responsive material in the sensor escapes therefrom, rendering the sensor unable to respond to temperature changes. Specifically, arm 30 engages a connecting member 62 whose other end contacts an arm 64 which is hinge-connected by member 66 to housing portion 34. A contact 68 on arm 64 is in operative alignment with another contact 70 supported upon a member 72. Normally, when the bulb 24 is full of helium and exposed to room temperature, the tube 14 is pressurized above atmospheric pressure and assumes the shape shown in FIG. 1. This maintains the contact pair 68 and 70 away from one another and thus no circuit is completed thereby. In a typical embodiment of the oven control, the bulb 24, capillary tube 22 and Bourdon tube 14 were filled with helium to pressurize them at about 22 psi when the ambient temperature is 70° F.

However, if the thermally expansive helium within the bulb 24 and tube 14 leaks therefrom, caused by rupture of either the bulb 24, capillary tube 22 or the Bourdon tube 14, the free end 26 of tube 14 moves to the left to a fully relaxed position and therefore the tube 14 will assume a more curved shape. This permits the hinge 32 to move the arm 30 counterclockwise about rivet 36 and causes arm 30 to move upward with respect to member 32. This permits hinge 66 to close the contact pair 68 and 70. As will be explained below, the closing of contacts 68 and 70 sets means in motion to terminate oven energization and thus prevent the oven temperature from increasing beyond a design temperature.

Figure 2:
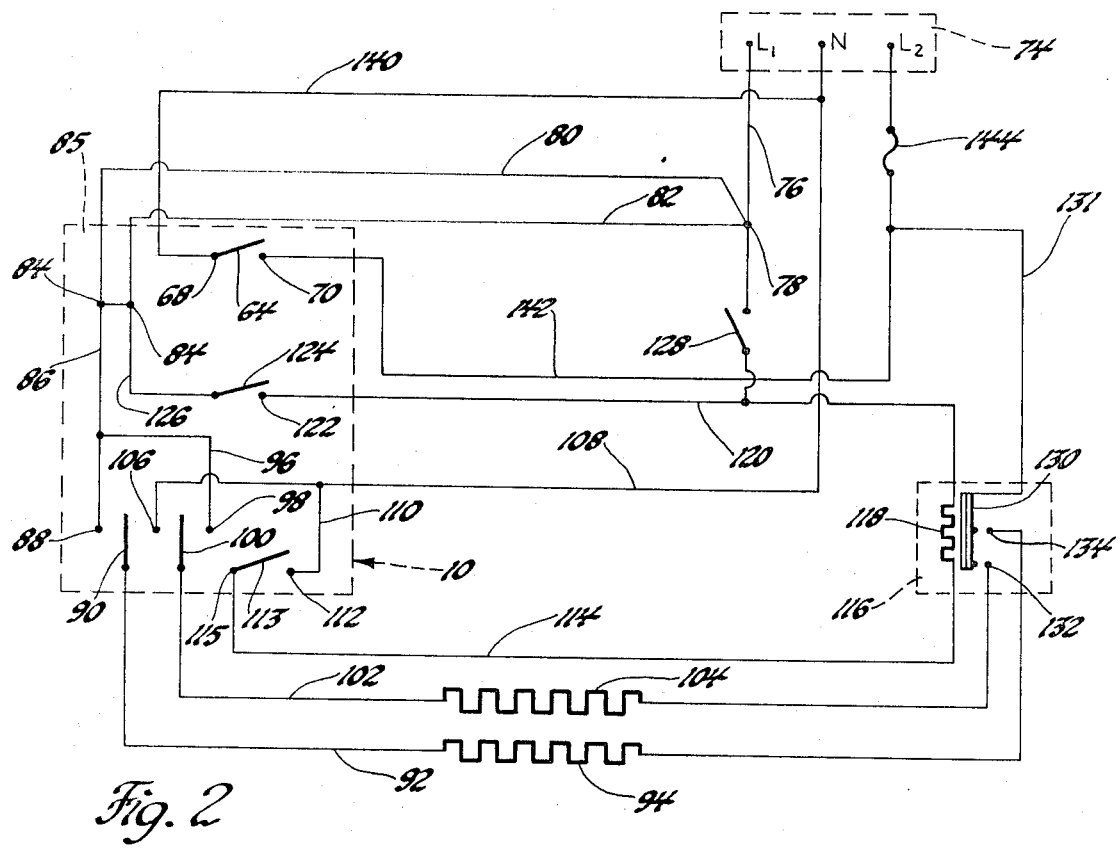
FIG. 2 is an electrical circuit for an oven utilizing the oven control assembly shown in FIG. 1.

Referring to FIG. 2, which is a circuit diagram of an oven including the subject oven control, an outlet terminal board 74 is shown having three terminals adapted to be connected to a three-wire 230 volt electrical source. The terminals are labeled $L_1$, N and $L_2$, as is common practice. $L_1$ is connected by a conductor 76 to a terminal 78, from which conductors 80 and 82 extend. Conductor 80 is connected to a terminal 84 of an oven thermostat 85 outlined in broken lines. Terminal 84 is connected by a conductor 86 to one pole 88 of a single pole double-throw switch having a movable arm 90. Arm 90 is connected by a conductor 92 to a Bake heating unit 94. Conductor 86 through a branch 96 extends to a terminal 98 of another single-pole, doublethrow switch having a movable arm 100. Arm 100 is connected by a conductor 102 to a Broil heating element 104. A third common terminal 106 of the aforesaid switch assemblies is connected by a conductor 108 to the terminal N on the terminal block 74. Conductor 108 is also connected by a branch 110 to a terminal 112 corresponding to the cycling contact 50 in FIG. 1. The switch arm 113 in FIG. 2 corresponds to arm 46 in FIG. 1 and is connected to terminal 115 which corresponds to contact 48 in FIG. 1. The conductor 114 extends from terminal 115 to a relay 116 and, more specifically, to one side of a biasing heater 118 within the relay. The other side of the biasing heater 118 is connected by a conductor 120 to terminal 122 of a switch 124 in the oven control 85. Switch 124 is connected by a conductor 126 to terminal 84 and hence through conductors 82 and 76 to the terminal $L_1$ of terminal block 74. The conductor 120 from the heater 118 is alternately connected to terminal $L_1$ through a switch 128 for energization of the heater 118 during a cleaning cycle of operation when switch 124 is open. The switch 128 is closed by operation of a lock arm mechanism (not shown) which is actuated during a Clean mode of operation.

When the cycling switch 46 is energized during either a Bake or Broil mode of operation, a circuit is completed from the N terminal on block 74 through conductor 108, branch 110 to terminal 112 (contact 50). The circuit then extends through the cycling arm 113, conductor 114 to the biasing heater 118 and hence through conductor 120, switch 124, conductor 126, conductor 82 and conductor 76 to terminal $L_1$. The resultant increase in temperature of heater 118 causes its bimetal arm 130 in relay 116 to move to the right in FIG. 2 and complete a circuit between Broil and Bake terminals 132, 134 and conductor 131. Thus, when the cycling switch 46 is closed, heater 118 is energized and the resultant movement of bimetal 130 completes a circuit through the Bake and Broil heating elements corresponding to the positions of the control switches 90 and 100. The oven control switches are connected in accordance with the following table which shows the connections during three modes of oven operation.

| Switch Terminals | OVEN CONTROLLER | | | |
|---|---|---|---|---|
| | Off | Bake | Broil | Clean |
| 122–124 | Open | Closed | Closed | Open |
| 88–90 | Open | Closed | Open | Open |
| 90–106 | Open | Open | Open | Closed |
| 98–100 | Open | Open | Closed | Closed |
| 100–106 | Open | Closed | Open | Open |
| 112–113 | Open | Cycle | Cycle | Cycle |
| 64–70* | Open | Open | Open | Open |

*Closed only when helium leaks from sensors 24, 22, 14 to completely relax Bourdon tube 14.

During a cleaning mode of operation, the various switches of oven control 85 are set according to the aforementioned table. Specifically, switch arm 90 is moved to engage terminal 106 which which connects the Bake heating unit 94 between the N and $L_1$ terminals of block 74. Arm 100 is moved to engage the terminal 98 which connects the Broil heating element 104 between terminals $L_1$ and $L_2$ of block 74. Energization of the biasing heater 118 of relay 116 during the Clean mode of operation is made through the interlock switch 128 bypassing switch 124. Bimetal arm 130 is moved in the same manner as previously described for the Bake and Broil modes of operation in response to opening and closing of the cycling switch 113. This maintains the temperature around 900° F.

Self-cleaning ovens of the type described produce a relatively high temperature of about 900° F. within the oven compartment to burn off food particles deposited upon the oven surfaces. A concern is that the temperature be limited below a predetermined maximum of, say, about 1100° F. to prevent damage to the oven surfaces. One cause of excessive temperatures may be a discharged temperature sensor caused by a leakage of the thermally expansive material (helium) from either the temperature bulb 24, capillary tube 22 or the Bourdon tube 14. When leakage occurs, the Bourdon tube will assume a more curved configuration than shown in FIG. 1 and the free end 26 will move to the left. The subject invention includes contacts 68 and 70 on members 64, 72, as shown in FIG. 1. They are similarly labeled in FIG. 2 for clarity. The contact 68 on arm 64 is connected by conductor 140 to terminal N of block 74. The other terminal 70 of switch 64 is connected by conductor 142 to a fuse 144. Fuse 144 is serially connected in the energization conductor 131, which is connected to terminal $L_2$ of terminal block 74 and completes the power circuit from relay 116 through the Bake and Broil heating units 94 and 104. If the temperature sensing members 14, 22 and 24 in the oven thermostat 85 are ruptured so as to leak significant quantities of helium therein, the free end 26 of the Bourdon tube 14 moves to the left and allows arm 30 to pivot counterclockwise, relieving the pressure of member 62 on arm 64 and subsequently permitting contacts 68 and 70 to engage. This completes a short-circuit from $L_1$ to N through fuse 144, causing it to quickly open. The opening of the energization circuit terminates heating by the units 94 and 104 and prevents the temperature of the oven from increasing.

While the embodiment shown is a preferred embodiment, other embodiments may be adapted and still fall within the scope of the invention as set forth in the following claims. It is particularly contemplated that the recited Bourdon type sensor may encompass other forms of thermally expansive containers, such as a bellows and, therefore, the term is not to be limited to the form illustrated; i.e., an arcuate coil-shaped flattened tube with a closed end.

What is claimed is as follows:

1. An oven having an oven temperature control assembly comprising: a circuit extending between electrical input terminals to oven-heating elements for energizing the same; means in said energizing circuit for sensing oven temperature to selectively energize said oven-heating elements for maintaining a preselected temperature within the oven; said sensing means including a curved Bourdon tube having a pressurized interior filled with a thermally expansive material to cause straightening of the tube with increasing oven temperatures; a contact pair operably controlled by movement of said Bourdon tube to cause said contacts to close only when said thermally expansive material leaks from said Bourdon tube, thus permitting it to assume a fully relaxed operative position which is more curved than the position assumed at room temperature and pressure; circuit breaking means in said energizing circuit adapted to terminate the energization of said heating elements when the circuit breaker is opened; the terminals of said contact pair being connected respectively to one input terminal of said energization circuit and to one side of said circuit breaking means to produce a shortcircuit extending through said contact pair and said circuit breaking means when said contact pair is closed, whereby an excessive current opens said circuit breaking means to terminate oven energization.

2. An oven having an oven temperature control assembly comprising: a circuit extending between electrical input terminals to oven-heating elements for energizing the same; means in said energization circuit sensing oven temperature to selectively energize said oven-heating elements for maintaining a preselected temperature within the oven; said sensing means including a curved Bourdon tube having a pressurized interior filled with a thermally expansive material to cause straightening of the tube with increasing oven temperatures; a switch arm having a contact operably controlled by said Bourdon tube and normally maintained a spaced distance from an associated contact under all operative conditions by the pressurized material within the interior of said Bourdon tube; said contact arm being moved into engagement with said associated contact when the tube interior is depressurized caused by discharge of material from said Bourdon tube interior, thus permitting the tube to assume a fully relaxed operative position which is more curved than the position assumed at room temperatures and pressures; a fuse in said energizing circuit adapted to terminate the energization of said heating elements when the fuse is opened; said contacts being connected respectively to one input terminal of said energization circuit and to one side of said fuse to produce a short-circuit extending through said contacts and said fuse when said contacts are engaged whereby an excessive current flows through said fuse to open it and terminate oven energization.

* * * * *